May 28, 1929. M. H. GREENEWALT 1,714,504
CONTROL SYSTEM FOR LIGHT AND COLOR PLAYERS
Filed July 16, 1925 4 Sheets-Sheet 1

INVENTOR
Mary Hallock Greenewalt
BY
Busser + Harding
ATTORNEYS

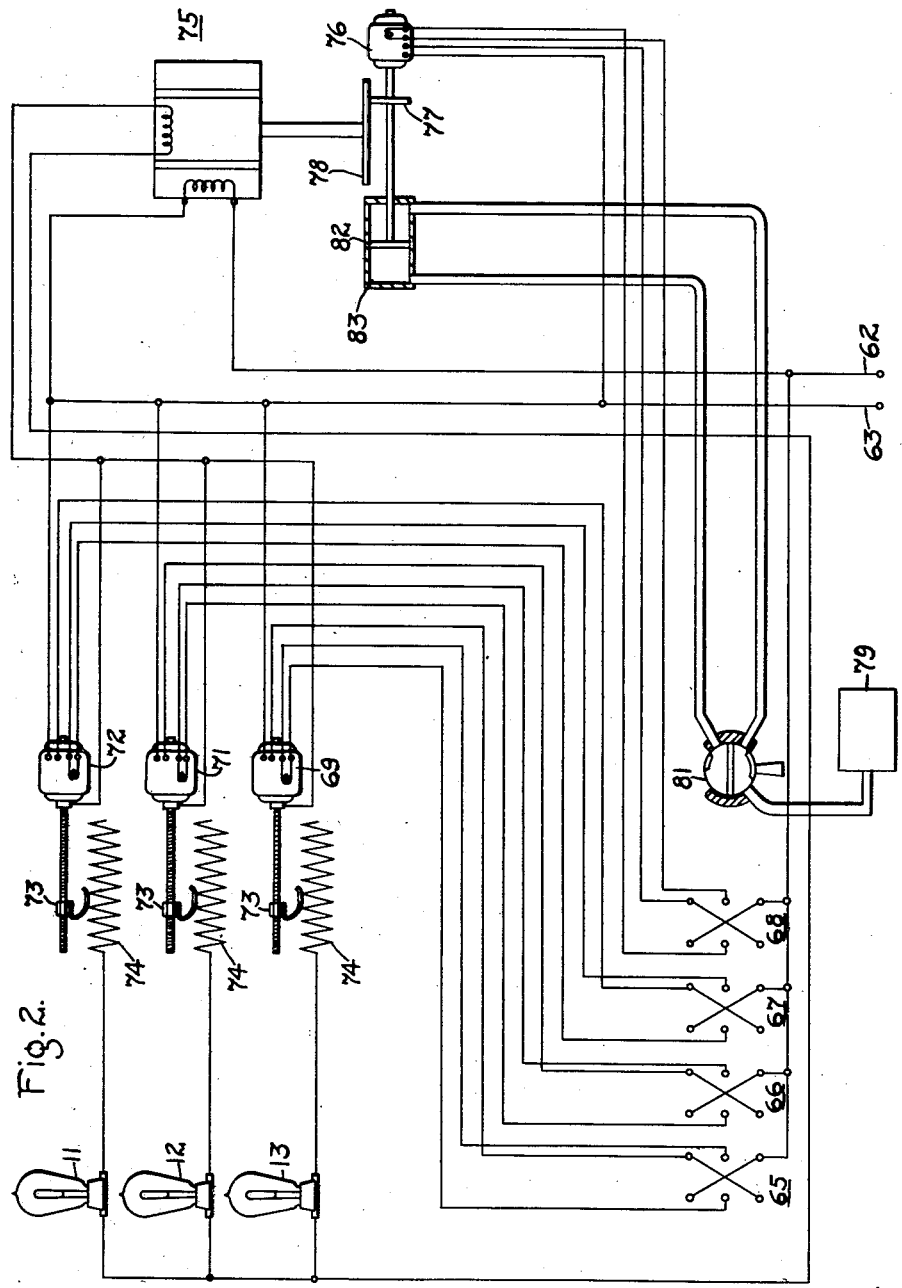

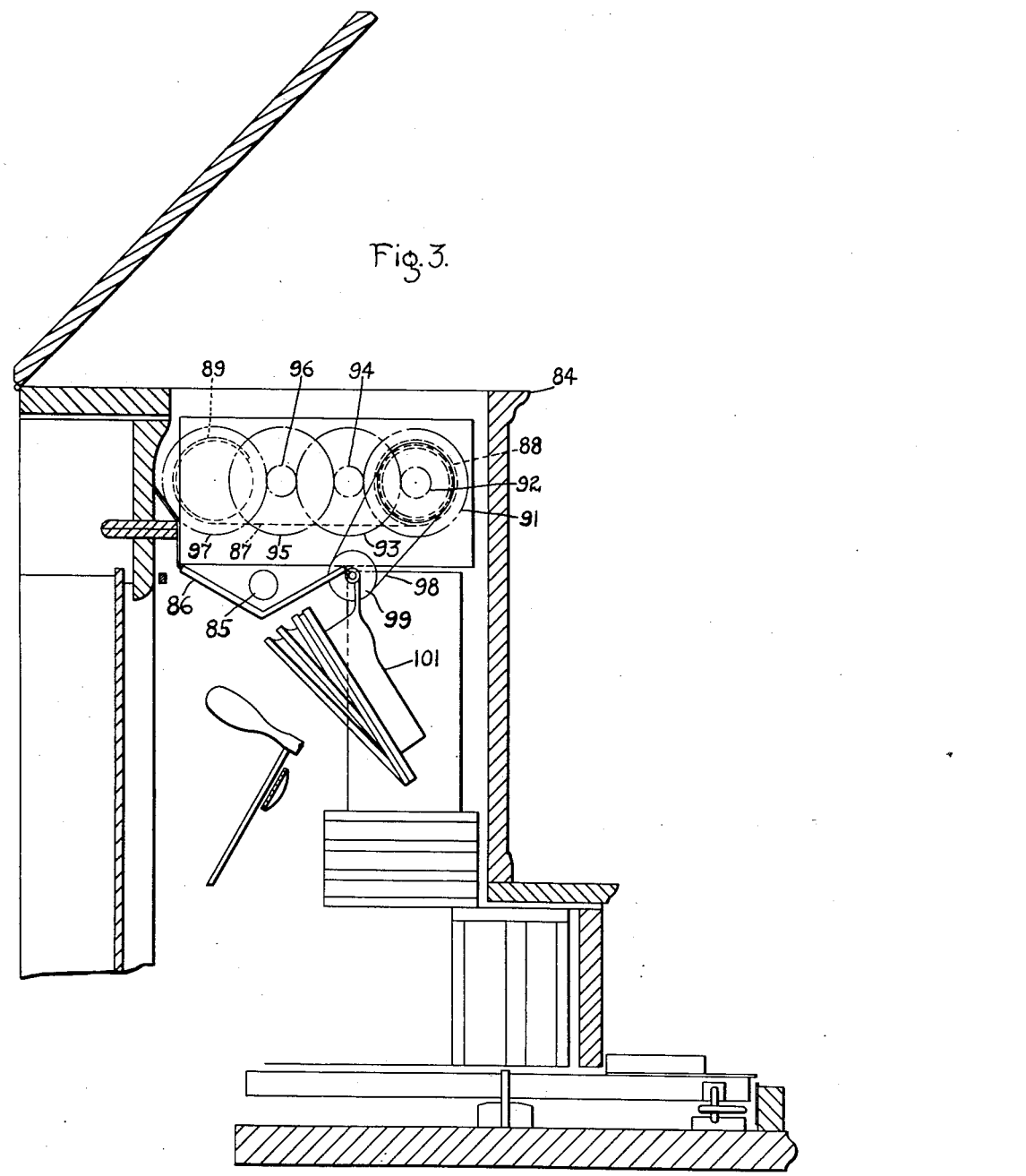

May 28, 1929.  M. H. GREENEWALT  1,714,504
CONTROL SYSTEM FOR LIGHT AND COLOR PLAYERS
Filed July 16, 1925  4 Sheets-Sheet 4
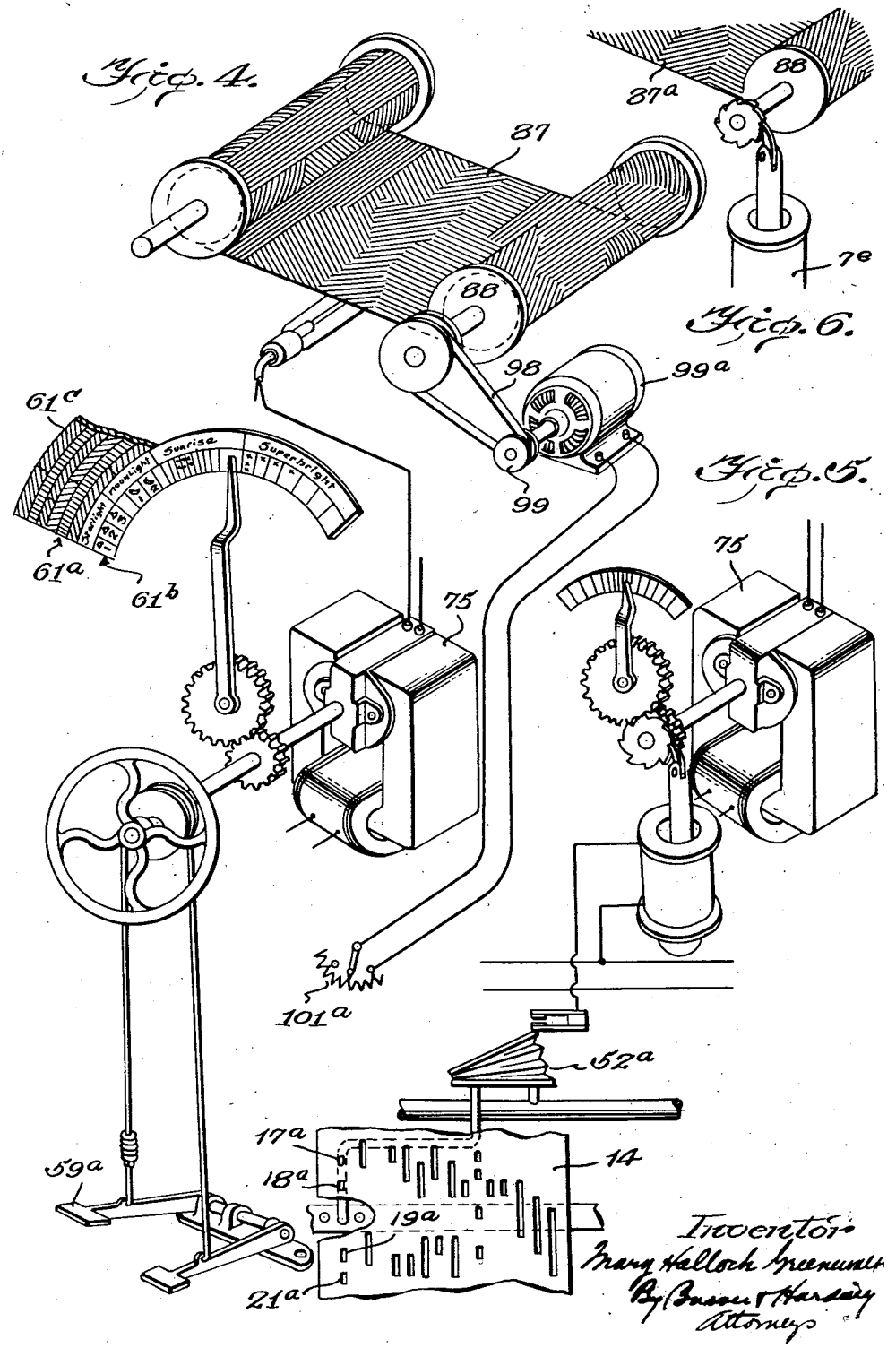

Patented May 28, 1929.

1,714,504

UNITED STATES PATENT OFFICE.

MARY HALLOCK GREENEWALT, OF PHILADELPHIA, PENNSYLVANIA.

CONTROL SYSTEM FOR LIGHT AND COLOR PLAYERS.

Application filed July 16, 1925. Serial No. 44,639.

My invention relates to apparatus for employing light and its color as a means of abstract and emotional expression in timed succession and particularly to control means for such apparatus.

Broadly, it is my desire to express emotions by means of timed variations of light and color in a manner analogous to that employed in the art of music. Such expression may be either for its own sake, or it may be as an accompaniment to another expression such as that made by words in poetry, notes in music, or pantomine or dancing. When employing light and color as a vehicle for expression we must consider not only the operating characteristics of the light source and of the mechanism controlling, modifying, and actuating the same, but we must consider also the physiological action and receptivity of the human eye, the vehicle by which the audience receives the impressions. We must consider particularly the time lag between the reception and the effective registration of a light impulse when designing any mechanism to be employed in such a light and color player. This mechanism must permit of bringing under the orderly jurisdiction of the light player artist's will such factors as intensity of the light, the changing manner of handling the increasing quantities of the light intensity as the brightness increases, the color thereof, manner of progression, convenience and suitability of timing, and many others.

One of the objects of my invention is to provide a control system for a light and color player that will permit the operator to selectively vary the intensity and the color of the spatial illumination in progressive and timed relations.

Another object of my invention is to provide a control system that will permit the flexible and orderly control of light and color capable of following that scope of time variation suggested in its range by the scope of time variation found in the recurrent pulse and the manner of amplification represented by the respiration of the human being with the least possible physical effort on his part, and with the least possible interference of mechanism and consequent time lag between the expression of his wish to register and the production of the effects he wishes to produce.

Another object of my invention is to provide a control system for a light and color player that will be highly flexible, easily operated, and that will permit of easily and quickly varying the timing of the successive impulses within wide limits as may be required by the abstract use and character of the composition being played by the operator.

Another object of my invention is to provide a control system for a light and color player that shall permit of flexible control of the increase or decrease of the intensity of the respective light sources while the color proportions thereof are under simultaneous selective consideration and timed control.

Another object of my invention is to provide a central control station for a plurality of spaced sources of light and color that shall permit of a unified control thereof to the end that a unity of impression may be created thereby on the audience.

In practicing my invention I provide a plurality of light sources, preferably incandescent lamps, that may respectively give light of one color only or that may have combined therewith means for selectively varying the color and the color timing of the individual light sources.

Electric means is provided for each light source to vary its intensity and remotely located devices control each of the electric means. A master regulator controls the energy input into all of the light sources subject at the moment to intensity play, and is actuated by a remote fluid-controlled electric means.

This application as filed is identical with applicant's prior application 657,731 filed August 16, 1923, as a division of application 252,133 filed August 30, 1918, now Patent 1,481,132.

In the drawings,

Figure 1 is a fragmentary diagrammatic view of a lighting system within the scope of my invention in which light sources, which may comprise electric lamps, are controlled by a perforated sheet such as is employed in mechanical music players; the sheet so employed having perforations therein through the instrumentality of which, acting in connection with properly co-operative means, instantaneous control of the lighting means is effected.

Fig. 2 is a schematic representation of a control system which I employ to produce the desired lighting effects with or without color accompaniment, and with or without the accompaniment of music, and, Fig. 3 is a diagrammatic view, mainly in cross section, of a portion of a piano, organ, or other key-played instrument, having means whereby atmospheric coloring in various intensities or shades may be produced.

Fig. 4 shows the combination of various parts of my invention.

Fig. 5 shows the automatic control of illumination intensities.

Fig. 6 shows the automatic control of a color screen.

Figure 1:
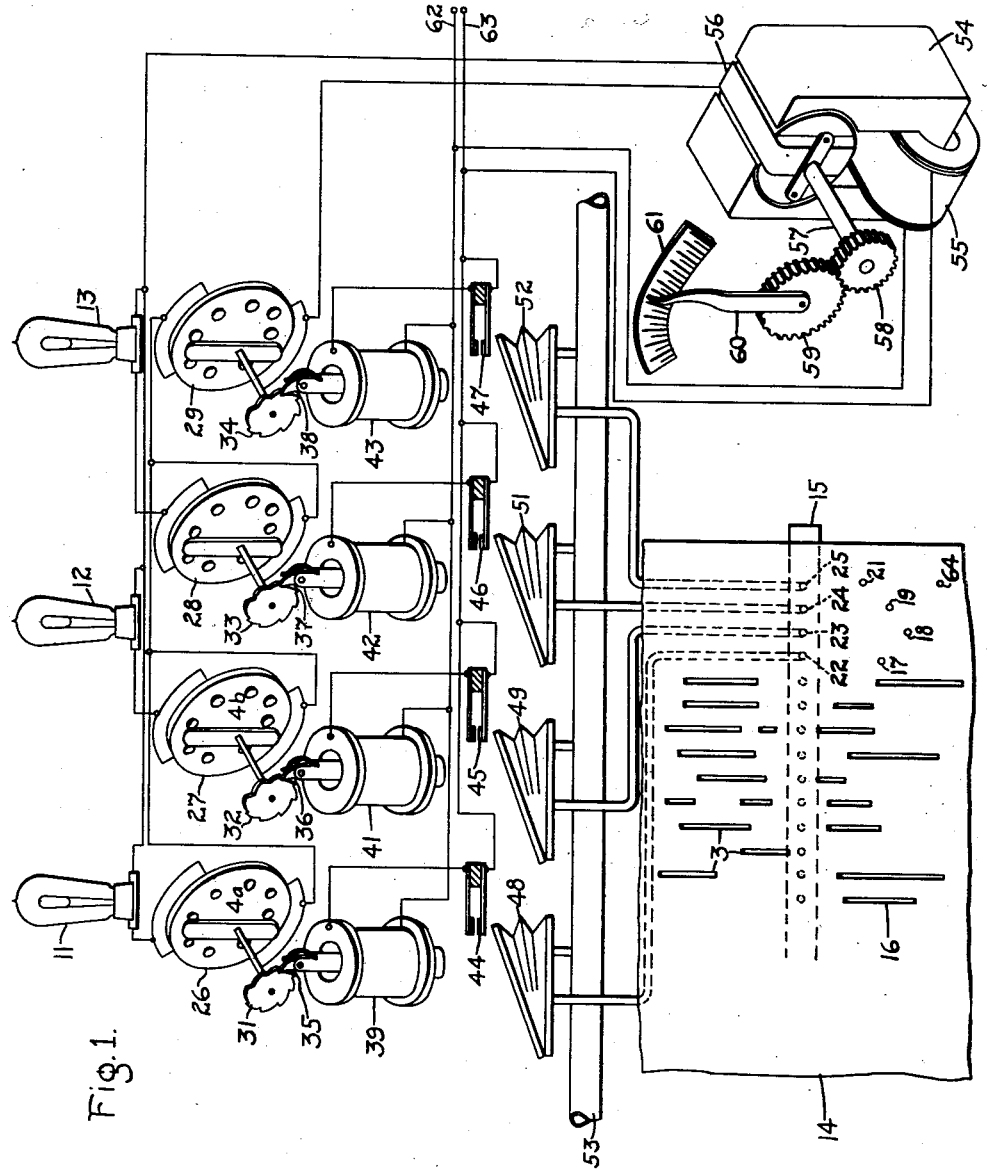

Referring more particularly to Fig. 1 of the drawing, a plurality of light sources 11, 12 and 13 are there diagrammatically represented as a single incandescent lamp each. I desire it to be understood, however, that any number of light sources are to be understood as being included thereunder, and that these individual or collective light sources may be located in any suitable or desired spatial relation relatively to each other to the audience or to the space to be illuminated.

Means for automatically controlling these light sources and the color varying means with which they may be manned, one form of which, shown in Fig. 3, will be hereinafter more particularly referred to, comprises a perforated sheet 14 common to mechanical, music players passing over a tracker board 15, the sheet 14 having the usual spaced perforations 16 therein for controlling the musical notes or tones produced by the instrument. In addition to the perforation 16 the sheet 14 is provided with rows of spaced apertures 17, 18, 19 and 21, designed to co-operate with a plurality of apertures 22, 23, 24 and 25 of the tracker board 15, whereby the control of the intensity of the light may be effected or as is more particularly shown in Fig. 5.

Each light source whether single or collective may be controlled by a rotary switch 26, 27, 28 and 29 between the contact points of which resistance elements may be included similarly to the individual resistances shown in Fig. 2, these switches comprising notched discs 31, 32, 33 and 34 that are respectively actuated by ratchet pawls 35, 36, 37, and 38 operatively connected to the cores of magnetic solenoids 39, 41, 42 and 43. The coils of the respective solenoids are controlled by co-operating contact members 44, 45, 46 and 47 that are respectively actuated and controlled by bellows 48, 49, 51 and 52.

An exhaust conduit for the plurality of bellows is indicated by the numeral 53.

An electric means for regulating the voltage supplied to the light sources 11, 12 and 13 comprises a yoke 54 of magnetic material, the magnetization of which is effected by a coil 56. A movably mounted coil 56 is located intermediate the poles of the yoke 54 and is mounted on a suitable shaft 57 supported in any suitable or desired manner to permit the coil 56 to have a turning movement relatively to the magnetic poles of the yoke 54. A small pinion 58 is mounted on the outer end of the shaft 57 and meshes with a co-operating gear wheel 59 that is suitably mounted to permit of its being turned by an indicating lever 60 the free end of which moves in front of a suitably graduated scale 61. The position of the coil 56 relatively to the yoke 54 determines the voltage applied to the respective light sources that are being energized, and a movement of the coil 56 by the arm 60 through the co-operating gear wheel and pinion provides a means of varying the light intensity of the energized light sources.

A plurality of conductors 62 and 63, that are connected to a suitable source of supply of electric energy, are provided for supply current to the light sources 11, 12 and 13, to the solenoids 39, 41, 42 and 43, and to the voltage regulator comprising the yoke 54 and the coils 55 and 56.

When the aperture 21 in the sheet 14 registers with the aperture 25 of the tracker board the bellows 52 is caused to expand, thereby operatively engaging the circuit closing means 47, energizing the solenoid 43, the plunger or core of which moves upwardly and turns the ratchet disc 34 by the pawl 38. This causes a turning movement of the contact bridging member of the switch 29 causing it to engage two contact terminals and closing the main circuit. When the aperture 17 in the sheet registers with the aperture 22 of the tracker board the bellows 48 expands and on its expansive movement actuates the circuit-closing means 44 to its closed position, thereby energizing the solenoid 39 causing the core thereof to move upwardly. This upward movement of the core causes the pawl 35 to actuate the ratchet disc 31, thereby causing a turning movement of the contact bridging member of the rotary switch 26 and energizing the lamp 11. It is obvious that regulating resistances may be included in or cut out of the circuit in substantially the same manner and that the color filtering means may also be actuated automatically as shown in Fig. 6.

When the apertures 18 or 19 of the sheet 14 register with the complemental apertures 23 or 24 in the tracker board, the operation of the several elements to energize the respective light sources 12 and 13 is the same as that effected by the registration of the apertures 17 and 22. When it is desired to interrupt the main circuit the rotary switch 29 must be given a suitable turning movement and this may be effected by providing an aperture 64 at the end of the sheet designed to register with the aperture 25 of the tracker board and move the bellows 52 to cause the circuit-closing means 47 to actuate the solenoid 43 to effect a turning movement of the contact bridging member of this switch. From the above it is evident that any number of apertures 17, 18, 19 or 21 may be provided in the sheet to automatically cause the energization or the de-energization either wholly or partially of any number of light sources in the particular sequence or at the particular time desired. It is also obvious that the electrical mechanism is entirely disconnected after the final aperture 64 effects the operation of the main rotary switch 29.

While I have illustrated electric lamps as the sources of light it will be understood that other forms of light producing elements may be employed under the control of the actuating mechanism which co-operates with the apertured sheet. It is also to be understood that I do not desire to be limited to the particular mechanism shown as it is illustrative only.

Fig. 2 illustrates diagrammatically a system of control for a plurality of light sources 11, 12 and 13. It is understood of course, that any desired number and arrangement of lights is intended to be represented by the individual light sources here illustrated, it being understood that due to the nature of light, the scale for the same shown in Fig. 1 beginning at the absolute of darkness may traverse by degrees first the light of one source only, the degrees of its scale brightness increase, registering progressively, compounded increases of light quantities. The lamps 11, 12 and 13 may be of any size and may be of different color or they may be combined or operated with means for selectively varying the color of illumination effected thereby by automatic means, Fig. 6, or as will be hereinafter more particularly referred to one form being shown in Fig. 3 and Fig. 4.

A plurality of reversing switches 65, 66, 67 and 68 may be located in closely spaced relation relatively to each other and to the relative positions of the fingers and thumbs of the hand, similar to the tilting tablets of an organ, the object being to provide switches having movements, to close one circuit and the other to open this circuit and close another circuit of lamps or other connections of the mechanism. Any suitable design effective to accomplish these objects may be employed. The reversing switches are adapted to control reversible motors 69, 71 and 72 respectively, that may be located close to the light sources to be controlled and at a distance from the control switches. When the switch 65, for instance, is moved in one direction to close a circuit, the corresponding motor 69 runs in one direction thus driving a sliding contact 73 and cutting in or out the desired amount of resistance in a resistance element 74 co-operating therewith. When the same switch is moved in the opposite direction the motor is energized to run in the opposite direction, and the movement of the sliding contact 73 is likewise reversed. This mechanism provides a means for increasing or decreasing the illumination value of the current traversing the respective lamps, thereby varying the intensity of the light emitted, and it may be noted that each lamp may be thus individually controlled. Any other equivalent means may, however, be employed instead of the motors.

Supply circuit conductors 62 and 63 represent the source of current supply for the electrical circuits and the equipment shown, and the numeral 75 indicates a voltage regulator or other similar device capable of varying the voltage supplied to the light sources, such current traversing devices may, it is understood, be scaled with light intensity indication as shown in Fig. 1.

The master regulator 75 is controlled in its operation by a reversing motor 76 that is in turn remotely controlled by the reversing switch 68. The motor 76 is operatively connected to the master regulator through a disc drive capable of wide spatial travel suited to the wide range of detailed light intensities comprising a friction wheel 77 operatively mounted on the motor shaft and engaging a co-operating friction disc 78 secured to an integral part of the master regulator 75. The master regulator may be of any suitable or desired type and construction and may be of the type having a stationary and a movable coil whose positions relatively to each other determine the current potencies supplied to the circuit controlled thereby. It may be located in any suitable or desired place as preferred or required.

A fluid pressure pump 79 may be provided and equipped with a manually-operable valve 81 which may be located at any suitable point preferably adjacent to the reversing switches hereinbefore described and remote from the master regulator. The valve 81 controls the position of the friction disc 77 that may be caused to move relatively to the face of the disc 78 by supplying fluid under pressure to either side of a piston 82 in a chamber 83. This flexible control may be designed to allow of timing the light and color variations within that limited horizon of attention covered by the timing range of a metronome, the flexibility allowing furtheremore a muscular control shading of such measurable time which to those conversant in the rhythmic arts may be felt as expressive modifications of the above said measurable time.

With the hereinbefore described mechanism a change in speed of the turning movement of the movable coil of the master regulator can be obtained by movement of the valve 81, which valve is under the control of the operator. It is evident that the motors 69, 71 and 72 may have their speed of operation varied by any suitable means, either electrical or by means similar to that connecting the driving motor with the master regulator. It is also evident that the actuating and controlling mechanism of the master regulator permits of varying the rate of change between wide spatial limits whereby the operator of such a mechanism through the ampleness of the motion required by muscular control of individual gradations, commensurate with the wide number of darkness and brightness gradation and the wide range of emotional values is able to determine the speed with the niceties of muscular co-ordinations with which changes in intensity of light are effected. The control aggregate provides a flexibly-controlled means for regulating the light intensity and the interaction of timing the intensity degree to the moment of the intensity succession.

Referring more particularly to Fig. 3, I have there illustrated a relatively simple means such as may be readily attached to an organ 84 or other instrument or any operating spot by means of which a color flooding or shading of space may be effected, by disposing within or prefarably adjacent to, the instrument suitable lighting means, a reflector, and a colored screen which may be marginally ruled comprising a translucent sheet passing in front of the light source. Further means by which the colored screen on which the color sections may be merged at their demarcating points for a smooth or irregular bridging of one color to another and may be colored in a predetermined sequence to suit any pre-determined emotional succession may be moved simultaneously with the progress of a timing such as is used by the rhythmic arts as played by the performer is provided and is effective to give the desired light diffusion, with or without coloration associated with the music, or the mechanism may be employed to give such color flooding without the accompaniment of the music.

An electric lamp 85 is here diagrammatically represented backed by a reflector 86 and having a colored film 87 passing in front thereof. The film which may be marginally marked at equal distances or otherwise as shown as a help to timing the desired entrance of any light modifying character carried by it before the lamp is carried by a roll 88 from which it is unwound and extends to a second roll 89 upon which it is wound. The roll 89 may be positively driven from the roll 88 by a suitable train of gearing 91, 92, 93, 94, 95, 96 and 97 gearing points of which may co-operate with the marginal marking of the color modifying means to allow of timing the spatial movement of said means. The roll 88 is positively driven by a chain or belt 98 from a wheel 99 which may be actuated by any suitable driving means such as an electric motor 99$^a$ or any other appropriate prime mover. A fluid control means 101, suited to sensitive variousness of muscular co-ordination control, here illustrated as a bellows which may be adapted to automatic color control, is provided to permit of obtaining a selective control of the speed of the wheel 99 and therefore of the timing of the various color portions actuated thereby.

As hereinbefore stated the illustrations of the light sources are diagrammatic only, and any desired number of individual light sources are to be understood as being comprised by the respective lamps 11, 12 and 13 which may be colored or may be manned with the color varying means shown in Fig. 3 in connection with lamp 85. As the mechanism and the control system embodying my invention are to be employed in auditoriums I may locate the lamps in any convenient locations as may be determined by the configuration of the room itself or by the spatial lighting effects that I may wish to obtain.

The control system hereinbefore described and embodying my invention provides a means under the control of the performer for varying the intensity of the light emitted by the light sources, and further provides a means for varying the energy supplied to all of the light sources simultaneously, thereby making it possible to merge light-color successions, based on æsthetic rhythm, by means of discrete portions or parts of light-color, color-shade, color-tint, as desired, through a one-to-one consonance for aggregate confluent effects. These variations in intensity suitably sealed as shown in Fig. 1 may be accompanied by a variation in the colors by the means illustrated in Fig. 3, Fig. 4 and Fig. 6 of the drawing, thereby placing the control of light and color effects in a given space completely under the control of timing the interaction of the intensity degree to the intensity progression and timing the color modification to both of a performer. The wide range of control obtainable by the hereinbefore described means permits of the performer varying the timing within relatively wide limits and of co-ordinating it even to the pulse and rhythm of the human body, thereby making it possible to create or effect the greatest possible impression upon an audience.

Various modifications may be made herein without departing from the spirit and scope of my invention, and all such modifications are intended to be covered by the appended claims.

I claim as my invention:

1. A light-color player including at least two sources of light of different colors arranged to illuminate a common field, operable means corresponding to each of said sources for producing a graded variation of the intensity in said field of the light therefrom independent of the means corresponding to the other source, and means independent of either of the preceding means for simultaneously varying the intensities in said field of light from both sources, all three means being simultaneously operable.

2. A light-color player including at least two sources of light of different colors arranged to illuminate a common field, operable means corresponding to each of said sources for producing a graded variation of the intensity in said field of the light therefrom independently of the means corresponding to the other source, and power operated means independent of either of the preceding means for simultaneously varying the intensities in said field of light from both sources, all three means being simultaneously operable.

3. A light-color player including at least two sources of light of different colors arranged to illuminate a common field, power operated means corresponding to each of said sources for producing a graded variation of the intensity in said field of the light therefrom independently of the means corresponding to the other source, power operated means independent of either of the preceding means for simultaneously varying the intensities in said field of light from both sources, all three means being simultaneously operable, and remote controlling devices for all of said means.

In testimony of which invention, I have hereunto set my hand, at Philadelphia, Penna., on this 13th day of June, 1925.

MARY HALLOCK GREENEWALT.